US008855599B2

(12) United States Patent
Buck et al.

(10) Patent No.: US 8,855,599 B2
(45) Date of Patent: Oct. 7, 2014

(54) METHOD AND APPARATUS FOR AUXILIARY COMMUNICATIONS WITH MOBILE COMMUNICATIONS DEVICE

(71) Applicant: Lookout, Inc., San Francisco, CA (US)

(72) Inventors: Brian James Buck, Livermore, CA (US); Jinggang Wang, Fremont, CA (US)

(73) Assignee: Lookout, Inc., San Francisco, CA (US)

( * ) Notice: Subject to any disclaimer, the term of this patent is extended or adjusted under 35 U.S.C. 154(b) by 0 days.

(21) Appl. No.: 13/732,083

(22) Filed: Dec. 31, 2012

(65) Prior Publication Data

US 2014/0187202 A1    Jul. 3, 2014

(51) Int. Cl.
*H04M 1/66*         (2006.01)
*H04W 12/08*        (2009.01)
*H04W 12/06*        (2009.01)
*H04W 12/02*        (2009.01)

(52) U.S. Cl.
CPC .............. *H04W 12/08* (2013.01); *H04W 12/02* (2013.01); *H04W 12/06* (2013.01)
USPC ............................ 455/410; 455/411; 455/565

(58) Field of Classification Search
CPC ....... H04W 4/12; H04W 4/023; H04W 12/02; H04W 12/06; H04W 12/08; H04W 12/12; H04W 4/02
USPC ............ 455/410, 411, 456.1, 461, 432.1, 565
See application file for complete search history.

(56) References Cited

U.S. PATENT DOCUMENTS 3,416,032 A    12/1968  Jahns et al.
4,553,257 A    11/1985  Mori et al.
5,319,776 A    6/1994   Hile et al.
5,574,775 A    11/1996  Miller, II et al.
5,715,518 A    2/1998   Barrere et al.
(Continued)

FOREIGN PATENT DOCUMENTS

GB    2430588       3/2007
WO    2007081356   7/2001

(Continued)

OTHER PUBLICATIONS

"Virgin Media—Phone Lost or Stolen?", web page downloaded Apr. 11, 2013 from http://www.virginmobile.com/vm/ukCoverage.do?contentId=insurance.howdoi.sm283.

(Continued)

*Primary Examiner* — Jean Gelin
(74) *Attorney, Agent, or Firm* — Dergosits & Noah LLP (57) ABSTRACT

A method and apparatus for auxiliary communications capability in a mobile communications device. The mobile communications device is configured with a hidden ROM that configures a security component to work separate and apart from the OS. A secondary transceiver is configured with the security component to send and receive security transmissions, also separate and apart from the OS and the primary transceiver of the OS. Logic to detect specified trigger events is hard-coded into the hidden ROM, and detection of such an event places the mobile communications device into a special security mode. While in the special security mode, the secondary transceiver can send and receive security messages, including the location of the mobile communications device. Further, depending upon the received messages or commands, the security component can take pre-programmed security actions, such as erasing or faking data in the device.

30 Claims, 6 Drawing Sheets

(56) References Cited

U.S. PATENT DOCUMENTS

| | | |
|---|---|---|
| 6,185,689 B1 | 2/2001 | Todd et al. |
| 6,269,456 B1 | 7/2001 | Hodges et al. |
| 6,272,353 B1 | 8/2001 | Dicker et al. |
| 6,301,668 B1 | 10/2001 | Gleichauf et al. |
| 6,453,345 B2 | 9/2002 | Trcka et al. |
| 6,529,143 B2 | 3/2003 | Mikkola et al. |
| 6,696,941 B2 | 2/2004 | Baker |
| 6,792,543 B2 | 9/2004 | Pak et al. |
| 6,892,225 B1 | 5/2005 | Tu et al. |
| 6,907,530 B2 | 6/2005 | Wang |
| 6,959,184 B1 | 10/2005 | Byers et al. |
| 7,020,895 B2 | 3/2006 | Albrecht |
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,159,237 B2 | 1/2007 | Schneier et al. |
| 7,171,690 B2 | 1/2007 | Kouznetsov et al. |
| 7,178,166 B1 | 2/2007 | Taylor et al. |
| 7,181,252 B2 | 2/2007 | Komsi |
| 7,210,168 B2 | 4/2007 | Hursey et al. |
| 7,228,566 B2 | 6/2007 | Caceres et al. |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,290,276 B2 | 10/2007 | Ogata |
| 7,304,570 B2 | 12/2007 | Thomas et al. |
| 7,305,245 B2 | 12/2007 | Alizadeh-Shabdiz |
| 7,308,256 B2 | 12/2007 | Morota et al. |
| 7,308,712 B2 | 12/2007 | Banzhof |
| 7,325,249 B2 | 1/2008 | Sutton et al. |
| 7,356,835 B2 | 4/2008 | Gancarcik et al. |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,397,424 B2 | 7/2008 | Houri |
| 7,397,434 B2 | 7/2008 | Mun et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,415,536 B2 | 8/2008 | Nakazawa |
| 7,433,694 B2 | 10/2008 | Morgan et al. |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz |
| 7,525,541 B2 | 4/2009 | Chun et al. |
| 7,551,579 B2 | 6/2009 | Alizadeh-Shabdiz |
| 7,551,929 B2 | 6/2009 | Alizadeh-Shabdiz |
| 7,634,800 B2 | 12/2009 | Ide et al. |
| 7,685,132 B2 | 3/2010 | Hyman |
| 7,696,923 B2 | 4/2010 | Houri |
| 7,768,963 B2 | 8/2010 | Alizadeh-Shabdiz |
| 7,769,396 B2 | 8/2010 | Alizadeh-Shabdiz et al. |
| 7,774,637 B1 | 8/2010 | Beddoe et al. |
| 7,783,281 B1 | 8/2010 | Cook et al. |
| 7,809,353 B2 | 10/2010 | Brown et al. |
| 7,809,366 B2 | 10/2010 | Rao et al. |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,856,373 B2 | 12/2010 | Ullah |
| 7,861,303 B2 | 12/2010 | Kouznetsov et al. |
| 7,907,966 B1 | 3/2011 | Mammen |
| 7,916,661 B2 | 3/2011 | Alizadeh-Shabdiz et al. |
| 7,991,854 B2 | 8/2011 | Bahl |
| 7,999,742 B2 | 8/2011 | Alizadeh-Shabdiz et al. |
| 8,014,788 B2 | 9/2011 | Alizadeh-Shabdiz et al. |
| 8,019,357 B2 | 9/2011 | Alizadeh-Shabdiz et al. |
| 8,031,657 B2 | 10/2011 | Jones et al. |
| 8,037,203 B2 | 10/2011 | Accapadi et al. |
| 8,054,219 B2 | 11/2011 | Alizadeh-Shabdiz |
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz |
| 8,108,555 B2 | 1/2012 | Awadallah et al. |
| 8,121,617 B1 | 2/2012 | LaGrotta et al. |
| 8,126,456 B2 | 2/2012 | Lotter et al. |
| 8,127,358 B1 | 2/2012 | Lee |
| 8,135,395 B2 | 3/2012 | Cassett et al. |
| 8,195,196 B2 | 6/2012 | Haran et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,346,860 B2 | 1/2013 | Berg et al. |
| 8,356,080 B2 | 1/2013 | Luna et al. |
| 8,364,785 B2 | 1/2013 | Plamondon |
| 8,370,580 B2 | 2/2013 | Mobarak et al. |
| 8,370,933 B1 | 2/2013 | Buckler |
| 8,401,521 B2 | 3/2013 | Bennett et al. |
| 8,447,856 B2 | 5/2013 | Drako |
| 8,463,915 B1 | 6/2013 | Kim |
| 8,484,332 B2 | 7/2013 | Bush et al. |
| 8,504,775 B2 | 8/2013 | Plamondon |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0108058 A1 | 8/2002 | Iwamura |
| 2002/0183060 A1 | 12/2002 | Ko et al. |
| 2002/0191018 A1 | 12/2002 | Broussard |
| 2003/0028803 A1 | 2/2003 | Bunker et al. |
| 2003/0046134 A1 | 3/2003 | Frolick et al. |
| 2003/0079145 A1 | 4/2003 | Kouznetsov et al. |
| 2003/0115485 A1 | 6/2003 | Milliken et al. |
| 2003/0120951 A1 | 6/2003 | Gartside et al. |
| 2003/0131148 A1 | 7/2003 | Kelley et al. |
| 2004/0022258 A1 | 2/2004 | Tsukada et al. |
| 2004/0025042 A1 | 2/2004 | Kouznetsov et al. |
| 2004/0133624 A1 | 7/2004 | Park |
| 2004/0158741 A1 | 8/2004 | Schneider |
| 2004/0185900 A1 | 9/2004 | McElveen |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0240999 A1 | 10/2005 | Rubin et al. |
| 2005/0254654 A1 | 11/2005 | Rockwell et al. |
| 2005/0278777 A1 | 12/2005 | Loza |
| 2005/0280557 A1* | 12/2005 | Jha et al. .................. 340/988 |
| 2005/0282533 A1 | 12/2005 | Draluk et al. |
| 2006/0026283 A1 | 2/2006 | Trueba |
| 2006/0073820 A1 | 4/2006 | Craswell et al. |
| 2006/0075388 A1 | 4/2006 | Kelley et al. |
| 2006/0080680 A1 | 4/2006 | Anwar et al. |
| 2006/0095454 A1 | 5/2006 | Shankar et al. |
| 2006/0101518 A1 | 5/2006 | Schumaker et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0217115 A1 | 9/2006 | Cassett et al. |

(56) References Cited

U.S. PATENT DOCUMENTS

| | | |
|---|---|---|
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011319 A1 | 1/2007 | Mcclure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Bryne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186282 A1 | 8/2007 | Jenkins |
| 2007/0190995 A1 | 8/2007 | Wang et al. |
| 2007/0214504 A1 | 9/2007 | Milani Comparetti et al. |
| 2007/0220608 A1 | 9/2007 | Lahti et al. |
| 2007/0240217 A1 | 10/2007 | Tuvell et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0253410 A1* | 10/2009 | Fitzgerald et al. ............ 455/411 |
| 2009/0292487 A1 | 11/2009 | Duncan et al. |
| 2009/0293125 A1 | 11/2009 | Szor |
| 2010/0019731 A1 | 1/2010 | Connolly et al. |
| 2010/0064341 A1 | 3/2010 | Aldera |
| 2010/0088398 A1 | 4/2010 | Plamondon |
| 2010/0097494 A1 | 4/2010 | Gum et al. |
| 2010/0100591 A1 | 4/2010 | Burgess et al. |
| 2010/0100939 A1 | 4/2010 | Burgess et al. |
| 2010/0100959 A1 | 4/2010 | Mahaffey |
| 2010/0100963 A1 | 4/2010 | Mahaffey et al. |
| 2010/0100964 A1 | 4/2010 | Burgess et al. |
| 2010/0154032 A1 | 6/2010 | Ollmann |
| 2010/0210240 A1 | 8/2010 | Mahaffey et al. |
| 2010/0240419 A1 | 9/2010 | Horino |
| 2010/0273452 A1* | 10/2010 | Rajann et al. ................ 455/411 |
| 2010/0041946 A1 | 12/2010 | Anderson et al. |
| 2010/0313270 A1 | 12/2010 | Kim et al. |
| 2010/0317324 A1 | 12/2010 | Anderson et al. |
| 2010/0332593 A1 | 12/2010 | Barash et al. |
| 2011/0047033 A1 | 2/2011 | Mahaffey et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0119765 A1 | 5/2011 | Burgess et al. |
| 2011/0145920 A1 | 6/2011 | Burgess et al. |
| 2011/0171923 A1 | 7/2011 | Daly et al. |
| 2011/0241872 A1 | 10/2011 | Mahaffey |
| 2011/0296510 A1 | 12/2011 | Hatlelid et al. |
| 2012/0042382 A1 | 2/2012 | Mahaffey |
| 2012/0060222 A1 | 3/2012 | Burgess et al. |
| 2012/0072569 A1 | 3/2012 | Xu |
| 2012/0084836 A1 | 4/2012 | Mahaffey et al. |
| 2012/0084864 A1 | 4/2012 | Burgess et al. |
| 2012/0096555 A1 | 4/2012 | Mahaffey |
| 2012/0110174 A1 | 5/2012 | Mahaffey et al. |
| 2012/0124239 A1 | 5/2012 | Shribman et al. |
| 2012/0159636 A1 | 6/2012 | Pandya et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0215938 A1 | 8/2012 | Fletcher et al. |
| 2012/0233695 A1 | 9/2012 | Mahaffey et al. |
| 2012/0259954 A1 | 10/2012 | McCarthy et al. |
| 2012/0278467 A1 | 11/2012 | Schneider |
| 2012/0303735 A1 | 11/2012 | Raciborski et al. |
| 2012/0317153 A1 | 12/2012 | Parthasarathy et al. |
| 2012/0317233 A1 | 12/2012 | Redpath |
| 2012/0317370 A1 | 12/2012 | Luna |
| 2012/0324076 A1 | 12/2012 | Zerr et al. |
| 2012/0324094 A1 | 12/2012 | Wyatt et al. |
| 2012/0324259 A1 | 12/2012 | Aasheim et al. |
| 2012/0324568 A1 | 12/2012 | Wyatt et al. |
| 2013/0013775 A1 | 1/2013 | Baumback et al. |
| 2013/0019311 A1 | 1/2013 | Swildens et al. |
| 2013/0023209 A1 | 1/2013 | Fisher et al. |
| 2013/0041946 A1 | 2/2013 | Joel et al. |
| 2013/0041974 A1 | 2/2013 | Luna et al. |
| 2013/0047034 A1 | 2/2013 | Salomon et al. |
| 2013/0054796 A1 | 2/2013 | Baumback et al. |
| 2013/0067054 A1 | 3/2013 | Pulleyn et al. |
| 2013/0086682 A1 | 4/2013 | Mahaffey et al. |

FOREIGN PATENT DOCUMENTS

| | | |
|---|---|---|
| WO | 2005101789 | 10/2005 |
| WO | 2006110181 | 10/2006 |
| WO | 2008007111 | 1/2008 |
| WO | 2008057737 | 5/2008 |
| WO | 2010048218 | 4/2010 |
| WO | 2010048220 | 4/2010 |
| WO | 2012027588 | 1/2012 |

OTHER PUBLICATIONS

Jung, Jaeyeon et al. "DNS Performance and the Effectiveness of Caching," IEEE/ACM. Transactions on Networking, vol. 10, Issue 5, Oct. 2002, pp. 589-603.

(56) References Cited

OTHER PUBLICATIONS

Wu, Yi et al. "Performance Analysis of DNS with TTL Value 0 as Location Repository in Mobile Internet," IEEE Wireless Communications and Networking Conference (WCNC), Mar. 11-15, 2007, pp. 3250-3255.

Liljeberg, M. et al. "Optimizing World-Wide Web for Weakly Connected Mobile Workstations: An Indirect Approach," Second Internatioinal Workshop on Services Distributed and Networked Environments, Jun. 5-6, 1995. pp. 132-139.

Song, Hui and Cao, Guohong. "Cache-Miss-Initiated Prefetch in Mobile Environments," Dept. of Computer Science and Engineering, The Pennsylvania State University, Computer Communications, vol. 28, Issue 7, May 2, 2005, pp. 741-753.

"Sprint—Report that your device is lost or stolen", web page downloaded Apr. 11, 2013 from http://support.sprint.com/support/article/Report_that_your_device_is_lost_or_stolen/case-ba416758-20090629-143222.

Tedeschi, Bob, "In Choosing a New Phone, Online Research Goes Only So Far", The New York Times, Oct. 7, 2009; downloaded Jul. 13, 2013 from http://www.nytimes.com/2009/10/08/technology/personaltech/08smat.html?_r=0.

PCT "International Search Report and Written Opinion of the International Searching Authority for PCT/US2013/027166", mailed on Jun. 19, 2013; received on Jun. 21, 2013.

PCT International Preliminary Report on Patentability for PCT/US2011/049182; Mailed on Mar. 7, 2013; pp. 1-9.

Richardson, Alexis, "Introduction to RabbitMQ", Google UK, available at http://www.rabbitmq.com/resources/google-tech-talk-final/alexis-google-rabbitmq-talk.pdf, retrieved on Mar. 30, 2012, 33 pages, published on Sep. 25, 2008.

Fisher, Oliver, "Malware? We Don't Need No Stinking Malware!", Google, available at http://googlewebmastercentral.blogspot.com/2008/10/ma;ware-we-don't-need-no-stinking.html, retrieved on Mar. 30, 2012, published on Nov. 14, 2006, 11 pages.

Reardon, Marguerite, "Mobile Phones That Track Your Buddies," Cnet, available at <http://news.cnet.com/Mobile-phones-that-track-your-buddies/2100-1039_3-6135209.html, retrieved Mar. 30, 2012, published on Nov. 14, 2006, 6 pages.

Fette, Ian "Understanding Phishing and Malware Protection in Google Chrome," The Chromium Blog, available at http://blog.chromium.org/2008/11/understanding-phishing-and-malware.htm>, retrieved on May 17, 2011, published on Nov. 14, 2008, 6 pages.

Kincaid, Jason "Urban Airship Brings Easy Push Notifications to Android," TechCrunch, available at http://techcrunch.com/2010/08/10/urban-airship-brings-easy-push-notifications-to-android/, retrieved on Jun. 16, 2011, published on Aug. 10, 2010, 5 pages.

Keane, Justin K. "Using the Google Safe Browsing API from PHP," Mad Irish, Aug. 7, 2009, available at http://www.madirish.net/node/245, retrieved Mar. 30, 2012, published on Aug. 7, 2009, 5 pages.

Jefferies, Charles P. "Webroot AntiVirus 2010 With Spy Sweeper Review," Notebook Review, available at http://www.notebookreview.com/default.asp?newsID=5700&review=Webroot+AntiVirus+2010+With+Spy+Sweeper+Review, retrieved on May 18, 2011, published on Jun. 22, 2010, 3 pages.

"Berry Locator", available at http://www.mobireport.com/apps/bl/, retrieved on Aug. 10, 2011, published Feb. 8, 2008.

Wikipedia, "Firefox Browser", available at http://en.wikipedia.org/wiki/Firefox_browser, retrieved on Aug. 10, 2011, published on Dec. 15, 2005.

F-Secure, "F-Secure Mobile Security for S60 Users Guide", pp. 1-34, retrieved on Aug. 10, 2011, published on Jan. 26, 2009.

Wikipedia, "Java Virtual Machine", available at http://en.wikipedia.org/wiki/Java_virtual_machine, retrieved on Aug. 10, 2011, published on Dec. 9, 2003.

Kaspersky "Kaspersky Mobile Security", available at http://usa.kaspersky.com/products-services/home-computer-security, published on Jan. 1, 2007, retrieved on Oct. 21, 2008.

"Kaspersky Mobile Security", Kaspersky Lab 2008, available at http://www.kaspersky.com/kaspersky_mobile_security, retrieved on Sep. 11, 2008, published on Jun. 22, 2010, 3 pages.

Symantec, "Symantec Norton Smartphone Security", available at http://www.symantec.com/norton/smartphone_security, retrieved on Oct. 21, 2008, published on Jan. 1, 2007.

"PhoneBak PDA Phone Anti-theft software for your PDA phone", 2007, Bak2u Pte Ltd (Singapore) pp. 1-4.

"PhoneBak: Mobile Phone Theft Recovery Software", 2007, Westin Tech.

Symantec, "Symantec Endpoint Security, Data Sheet and Product Screen Shot", retrieved on Oct. 21, 2008, published on Jun. 15, 2008.

Symantec, "Symantec Mobile Security Suite for Windows Mobile, Data Sheet and Product Screen Shot", available at http://www.symantec.com/norton/smartphone_security, retrieved on Oct. 21, 2008, published on Mar. 1, 2008.

TippingPoint "TippingPoint Security Management System (SMS)", available at http://www.tippingpoint.com/products_sms.html, retrieved on Oct. 21, 2008, published on Mar. 31, 2005, 2 pages.

Summerson, Cameron "5 Android Antivirus Apps Compared, Find Out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.

"Android Cloud to Device Messaging Framework," Google Code Labs, available at http://code.google.com/android/c2dm/, retrieved on Sep. 14, 2011, published on Apr. 11, 2011, 9 pages.

"BlackBerry Push Service Overview," available at http://us.blackberry.com/developers/platform/pushapi.jsp#tab_tab_resources, retrieved on Sep. 14, 2011, published on Nov. 6, 2010, 21 pages.

"eSoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 30, 2012, published on Mar. 23, 2010, 2 pages.

"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.

"Hooking—Wikipedia, the Free Encyclopedia," Wikipedia, available at http://web.archive.org/web/20100415154752/http://en.wikipedia.org/wiki/Hooking, retrieved Mar. 30, 2012, published on Apr. 15, 2010, 6 pages.

Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.

"Pidgin the Universal Chat Client," Pidign, available at http://www.pidgin.im/, retrieved Sep. 14, 2011, published on May 1, 2007, 14 pages.

Pogue, David "Simplifying the Lives of Web Users," The New York Times, available at http://www.nytimes.com/2010/08/19/technology/personaltech/19pogue.html, retrieved May 17, 2011, Published on Aug. 18, 2010, 5 pages.

"Twilio Cloud Communications Web Service API for Building Voice and SMS Applications," Twilio, available at http://www.twilio.com, retrieved Sep. 14, 2011, published on Jun. 5, 2008, 12 pages.

"Understanding Direct Push," Microsoft, Feb. 18, 2009, available at http://technet.microsoft.com/en-us/library/aa997252(v=exchg.80).aspx, retrieved on Mar. 30, 2012, published on Feb. 18, 2009, 3 pages.

"Urban Airship: Powering Modern Mobile," available at http://urbanairship.com/products/, retrieved on Sep. 16, 2011, published on Feb. 19, 2010, 14 pages.

"zVeloDB URL Database," zVelo, available at https://zvelo.com/technology/zvelodb-url-database, retrieved Mar. 30, 2012, published on Jan. 21, 2012, 2 pages.

Amazon.com: Mining the Web Discovering Knowledge from Hypertext Data (9781558607545): Soumen Chakrabarti: Books, Amazon available at http://www.amazon.com/exec/obidos/ASIN/1558607544/, retrieved on Jun. 7, 2012, published on Dec. 13, 2001, pp. 1-7.

Clickatell, available at http://www.clickatell.com, retrieved Sep. 14, 2011, published on Jan 18, 2011, 11 pages.

(56) References Cited

OTHER PUBLICATIONS

Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.

Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.

Grafio "Stay Secure", available at http://widgets.opera.com/widget/4405/, retrieved Oct. 21, 2008, published on Sep. 29, 2008.

McAfee, Internet Archive, Way Back Machine, available at <http://web.archive.org/web/20080611095201/www.qualys.com/solutions/vulnerability_management>retrieved Feb. 24, 2011, 1 page.

HTC "Mobile Wipe Smart Phone Management", pp. 1-4, published on Dec. 5, 2007, retrieved on Dec. 5, 2007.

PagerDuty, available at http://www.pagerduty.com, retrieved on Sep. 14, 2011, published on Jun. 6, 2009, 23 pages.

PCT "International Search Report and Written Opinion of the International Searching Authority for PCT/US2009/061370", mailed on Dec. 14, 2009.

PCT "International Search Report and Written Opinion of the International Searching Authority for PCT/US2009/061372", mailed on Mar. 24, 2010; received on Mar. 29, 2010.

PCT, "International Search Report and Written Opinion of the International Searching Authority for PCT/US2011/049182", mailed on Dec. 23, 2011.

Prey, available at http://preyproject.com/, retrieved Jan. 10, 2012, published on May 16, 2009, 4 pages.

Qualys, "Executive Dashboard," Internet Archive, Way back Machine, availble at <http://web.archive.org/web20080507161417/www.qualys.com/products/screens/?screen=Executive + Dashboard>, retrieved Feb. 23, 2011, 1 page.

Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.

Real world Computing, Jun. 16, 2008 (PC Pro), pp. 1-2.

Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.

Teh, Joe, "Norton 360 Version 3.0 Review," Mar. 9, 2009, Available at <http://techielobang-com/blog/2009/03/09/norton-360-version-30-review/> Retrieved Feb. 23, 2011, 12 pages.

Sprite Mobile, Sprite Backup, Internet Archive, Way Back Machine, available at http://web.archive.org/web/20080901220103/http://www.spritesoftware.com/?page_id=280, Jan. 16, 2013.

Sprint Nextel, Mobile Locator, Internet Archive, WayBack Machine, http://web.archive.org/web/20080901070835/http://www.nextel.com/en/solutions/gps/mobile_locator.shtml, 2pgs.

Trillian, available at http://www.trillian.im/, retrieved on Sep. 14, 2011, published on Oct. 11, 2007, 24 pages.

Non-Final Office Action dated Apr. 14, 2011 for U.S. Appl. No. 12/255,614, filed Oct. 21, 2008; pp. 1-6.

Non-Final Office Action dated Apr. 13, 2011 for U.S. Appl. No. 12/255,621, filed Oct. 21, 2008; pp. 1-7.

Final Office Action dated Feb. 1, 2011 for U.S. Appl. No. 12/255,626, filed Oct. 21, 2008; pp. 1-18.

Non-Final Office Action dated Mar. 24, 2011 for U.S. Appl. No. 12/255,635, filed Oct. 21, 2008; pp. 1-17.

Notice of Allowance dated Nov. 3, 2011 for U.S. Appl. No. 12/255,632, filed Oct. 21, 2008; pp. 1-5.

Non-Final Office Action dated Apr. 13, 2011 for U.S. Appl. No. 12/255,632, filed Oct. 21, 2008; pp. 1-7.

Non-Final Office Action dated Dec. 26, 2012 for U.S. Appl. No. 13/160,382, filed Jun. 14, 2011; pp. 1-23.

Virus Total, VT Community, www.virustotal.com/index.html; Dated Dec. 16, 2011; 44 Pages.

Windows Update, Internet Archive, Way Back Machine, available at <http://web.archive.org/web/20071022193017/http://en.wikipedia.org/wiki/Windows_Update> Retrieved Feb. 23, 2011.

\* cited by examiner

METHOD AND APPARATUS FOR AUXILIARY COMMUNICATIONS WITH MOBILE COMMUNICATIONS DEVICE

COPYRIGHT NOTICE

A portion of this patent disclosure contains material which is subject to copyright protection. The copyright owner has no objection to the facsimile reproduction by anyone of the patent disclosure, as it appears in the records of the U.S. Patent & Trademark Office, but otherwise reserves all rights.

TECHNICAL FIELD

This disclosure relates generally to mobile communications devices, and more particularly, to devices, methods and systems for providing auxiliary communication capability in a mobile communications device.

BACKGROUND

The use of mobile communications devices continues to experience astronomical growth. Factors contributing to this growth include advancements in network technologies, lower data usage costs, and the growing adoption of smartphones, such as Android®- and Apple®-based smartphones. As a result, many users now have multiple computer-based electronics devices, many or all of which are in use and operating at one time, such as a smartphone, a laptop computer, a desktop computer, a tablet, etc.

A key feature of such devices is that they are small and relatively lightweight. Thus, people tend to typically carry these devices with them everywhere throughout the day, for example, to work, meetings, appointments, restaurants, coffee shops, bars, and so forth. Because such devices are small and lightweight, it can be very easy to lose or misplace such a device, or to have it stolen.

Techniques for recovering or locating a lost or stolen mobile communications device are known. For example, U.S. Patent Publication No. 2010/0210240 entitled System and Method for Remotely Securing or Recovering a Mobile Device, expressly incorporated herein by reference, discloses the use of a remote web access page to interact with the missing device, for example, to lock the device, to locate the device, to back up data, to restore data, or to erase data. Likewise, related U.S. Patent Publication No. 2012/0188064 entitled System and Method for Remotely Initiating Playing of a Sound on a Mobile Device, expressly incorporated herein by reference, discloses remote initiation of a sound from the device from the remote web access page. Also, U.S. Publication No. 2012/0196571 entitled System and Method for Remotely-Initialed Audio Communication, expressly incorporated herein by reference, discloses techniques for establishing audio communication with the missing device. However, each of these solutions is built on and relies upon the operating system of the device, which may be wiped and completely re-installed with a new image if the device is actually stolen, thereby rendering these solutions ineffective.

Thus, it would be desirable to have a secure method for locating a mobile communications device that is lost or has been stolen.

BRIEF DESCRIPTION OF THE DRAWINGS

This disclosure is illustrated by way of example and not limitation in the figures of the accompanying drawings, in which like references indicate similar elements, and in which.

DETAILED DESCRIPTION

This disclosure describes systems and methods for providing auxiliary communications capability in a mobile communications device. In one embodiment, the mobile communications device is configured with a hidden secondary read-only memory that defines a security component working separately from and in parallel with the regular operating system of the device. A secondary transceiver is also configured with the security component to send and receive security transmissions separate and apart from the primary transceiver of the operating system.

On start-up of the mobile communications device, the secondary read-only memory, the security component, and the secondary transceiver are initialized first, before the initialization of the primary read-only memory, and thus before loading the operating system. Pre-programmed logic is hard-coded in the secondary read-only memory which defines trigger events that will place the mobile communications device into a special security mode. While in the special security mode, the secondary transceiver can send and receive security messages, including the location of the mobile communications device. Further, depending upon the received messages or commands, the security component can take pre-programmed security actions, such as erasing or faking data.

1. HARDWARE/SOFTWARE ENVIRONMENT

Embodiments of this disclosure can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein. The mobile communications devices described herein are computer-based devices running an operating system for use on handheld or mobile devices, such as smartphones, PDAs, tablets, mobile phones and the like. For example, a mobile communications device may include devices such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™.

In the context of this disclosure, a computer usable medium or computer readable medium may be any non-transitory medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to herein as components or modules or data objects or data items. Applications may be hardwired or hard coded in hardware or take the form of software executing on a general purpose computer such that when the software is loaded into and/or executed by the computer, the computer becomes an apparatus for practicing embodiments of the disclosure. Applications may also be downloaded in whole or in part through the use of a software development kit or toolkit that enables the creation and implementation of an embodiment of the disclosure. In this specification, these implementations, or any other form that an embodiment of the disclosure may take, may be referred to as techniques. In general, the order of the steps of disclosed processes may be altered within the scope of the disclosure.

As used herein, the term "mobile communications device" generally refers to mobile phones, PDAs, smartphones and tablets, as well as embedded or autonomous objects and devices that make up the nodes or endpoints in the "Internet of Things." The term "mobile communications device" also refers to a class of laptop computers which run an operating system that is also used on mobile phones, PDAs, or smartphones. Such laptop computers are often designed to operate with a continuous connection to a cellular network or to the internet via a wireless link. The term "mobile communications device" excludes other laptop computers, notebook computers, or sub-notebook computers that do not run an operating system that is also used on mobile phones, PDAs, and smartphones. Specifically, mobile communications devices include devices for which wireless communications services such as voice, messaging, data, or other wireless Internet capabilities are a primary function. As used herein, a "mobile communications device" may also be referred to as a "device," "mobile device," "mobile client," or "handset." However, a person having skill in the art will appreciate that while the present invention is disclosed herein as being used on mobile communications devices, the present invention may also be used on other computing platforms, including desktop, laptop, notebook, netbook or server computers.

As used herein, the term "client computer" refers to any computer, embedded device, mobile device, or other processor-based system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

Figure 1:
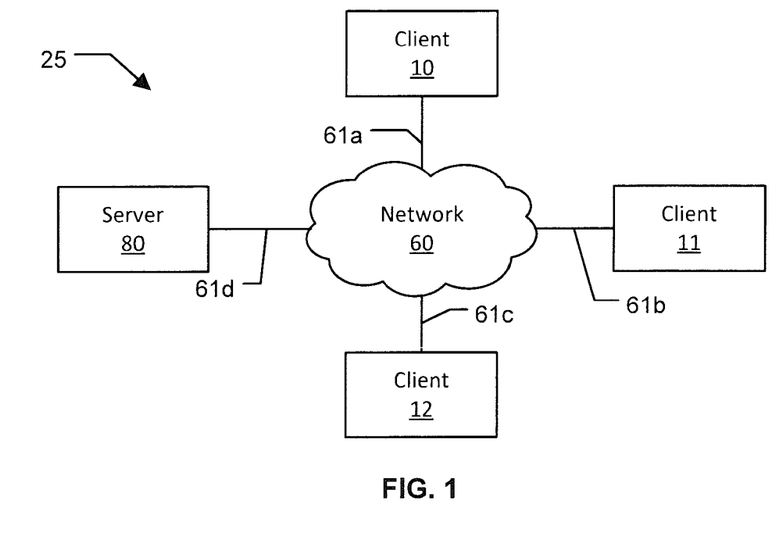
FIG. 1 is a simplified block diagram illustrating a distributed computing system.

FIG. 1 is a block diagram of a simple distributed computer network 25 having a number of client systems 10, 11 and 12, and a server system 80, all coupled to a communications network 60 via a plurality of communications links 61a, 61b, 61c, 61d. Communications network 60 provides a mechanism for allowing the various components of distributed network 25 to communicate and exchange information with each other.

Communications network 60 may itself be comprised of many interconnected computer systems and communications links. Communications links 61 may be hardwire links, optical links, satellite or other wireless communications links, wave propagation links, or any other mechanisms for communication of information. Various communications protocols may be used to facilitate communication between the various systems shown in FIG. 1. These communications protocols may include TCP/IP, HTTP, WAP, vendor-specific protocols, customized protocols, Internet telephony, IP telephony, digital voice, voice over broadband (VoBB), broadband telephony, Voice over IP (VoIP), public switched telephone network (PSTN), and others. In one embodiment, the communications network 60 is the Internet, while in other embodiments, the communications network may be any suitable communications network including a local area network (LAN), a wide area network (WAN), a wireless network, an intranet, a private network, a public network, a switched network, and combinations of these, and the like.

Distributed computer network 25 in FIG. 1 is merely illustrative of one embodiment and not intended to be limiting. One of ordinary skill in the art would recognize other variations, modifications and alternatives. For example, more than one server system 80 may be connected to the communications network 60, and other computing resources may be available to the server or the network. As another example, any number of client systems 10, 11 and 12 may be coupled to communications network 60 via an access provider (not shown) or some other server system.

A client system typically requests information from a server system, which then provides the information in response. Server systems typically have more computing and storage capacity than client systems. However, any computer system may act as either a client or server depending on whether the computer system is requesting or providing information. Aspects of the systems and methods described herein may be embodied in either a client device or a server device, and may also be embodied using a client-server environment or a cloud-cloud computing environment.

In the configuration of FIG. 1, server 80 is responsible for (i) receiving information requests from any of client systems 10, 11 and 12, (ii) performing processing required to satisfy the requests, and (iii) forwarding the results corresponding to the requests back to the requesting client system. The processing required to satisfy the request may be performed by server system 80 or may alternatively be delegated to other servers or resources connected to server 80 or communications network 60.

Client systems 10, 11 and 12 enable users to access and query information or applications stored by or accessible through server system 80. Some example client systems include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™, Android™ OS, Google Chrome OS, Symbian OS®, Windows Mobile® OS, Windows Phone, BlackBerry OS, Embedded Linux, webOS, Palm OS® or Palm Web OS™.

In one embodiment, a web browser application executing on a client system enables users to select, access, retrieve, or query information and/or applications stored by or accessible through server system 80. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

Figure 2:
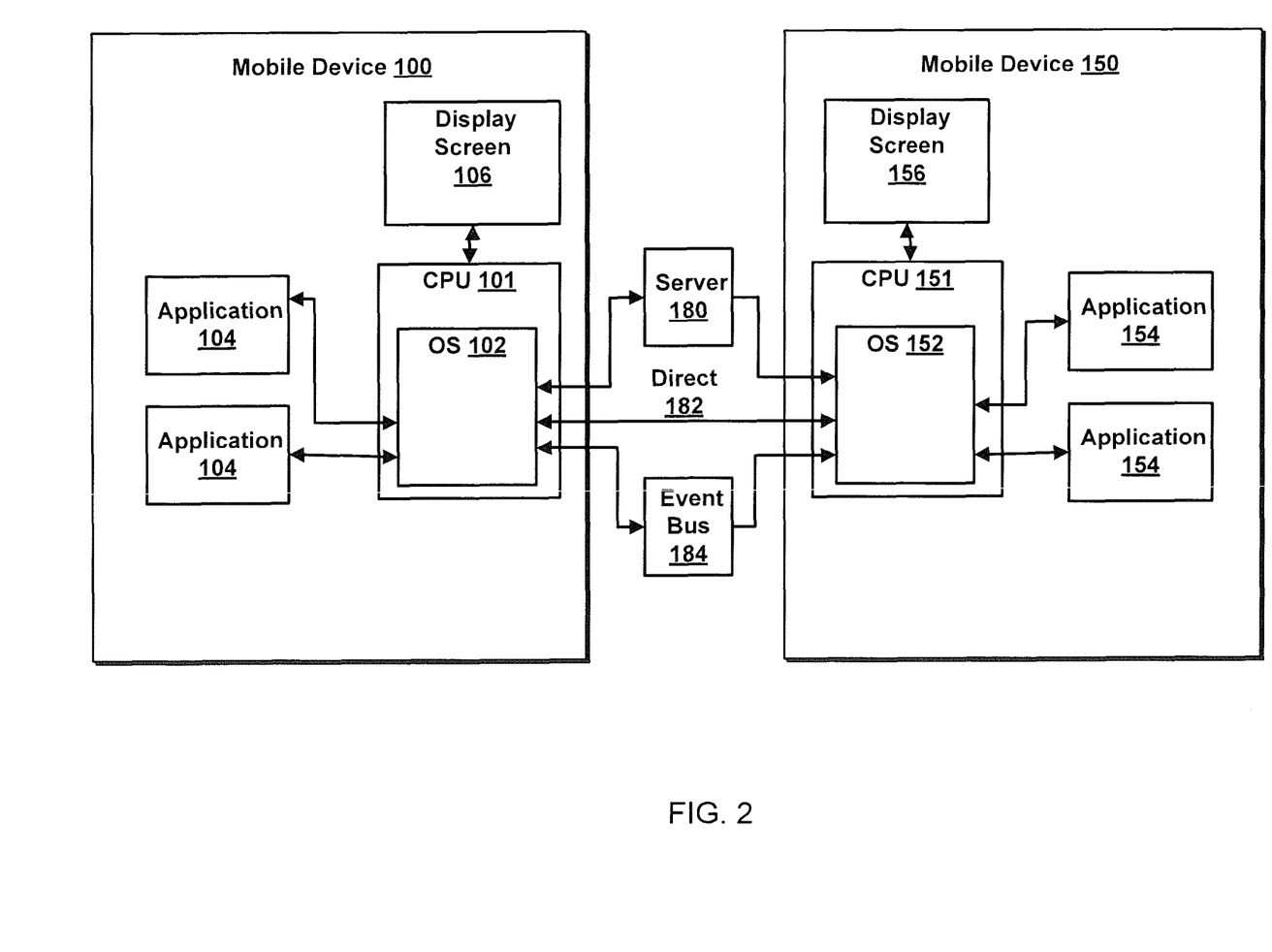
FIG. 2 is a block diagram illustrating a pair of mobile communications devices interconnected by alternative communications links.

FIG. 2 illustrates three alternative options for coupling similar client computing devices 100 and 150. On the most basic level, computing device 100 has operating system (OS) 102 running on a central processing unit (CPU) 101, with applications 104 installed on the device, and results displayed on display screen 106. Likewise, computing device 150 has OS 152 running on a CPU 151, with applications 154 installed on the device, and results displayed on display screen 156. The devices could communicate via a server 180, as already discussed, which may be configured with a server-based or cloud-based service that accommodates communication between the devices. The devices could also be configured to have a direct communications link 182 between the devices using a standard communications protocol, such as Wi-Fi, Bluetooth, NFC, etc. In addition, the devices could also communicate via a dedicated event bus 184 to which the devices are coupled and relevant events and notifications may be posted.

There are also hybrid options in which a server or cloud-based service may be used for a device "rendezvous," namely, a site where the devices locate each other, but subsequently use a different communication mechanism to communicate among themselves. For example, using a direct communications protocol, the devices may initiate communications via the direct protocol itself, or instead by using a directory-style lookup to obtain an IP address. Also, a web server running on a client device could have an address that was communicated via a discovery process or directory lookup to another client device.

Client device 100 could be configured to maintain a persistent connection to client device 150 through the direct link 182 or the cloud-based service 180, regardless of which side initiated the connection. A periodic connection can be initiated from either end of the connection, such as polling in a push or pull scenario. The event bus 184 is typically connected logically to all devices that are registered with or listening to the event bus.

Figure 3:
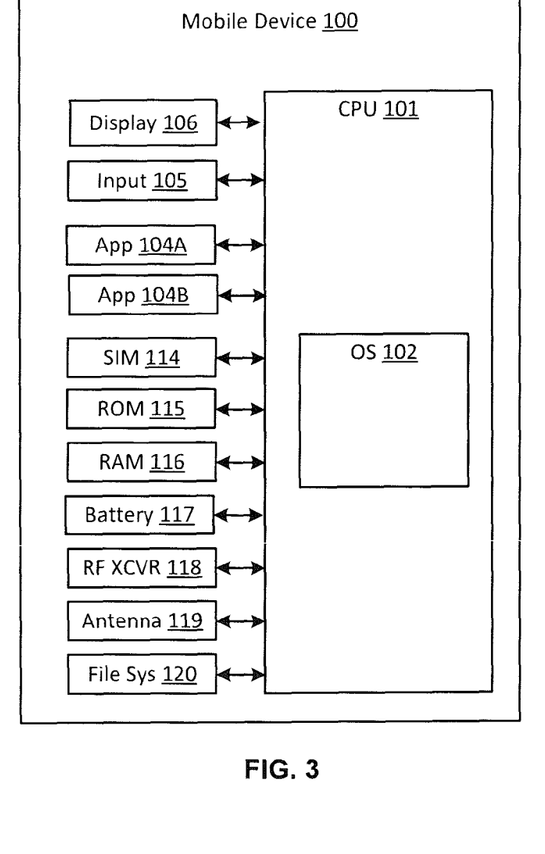
FIG. 3 is a block diagram of a computing device embodied as a conventional mobile communications device.

Client device 100 may be embodied as a mobile communications device, as illustrated in more detail in FIG. 3. In various embodiments described herein, a user can interface with other devices, networks, systems, etc., through mobile communications device 100. Mobile communications device 100 is a processor-based computing device having a central processing unit (CPU) 101 controlled through an operating system (OS) 102, which provides the interface for hardware and software operations on the device, including various applications 104, input device(s) 105, display 106 and file system 120.

Input device 105 may include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

File system 120 is provided for mass storage, which for a mobile communications device may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Also provided on mobile communications device 100 are standard components such as memory including subscriber identity module (SIM) card 114, read-only memory (ROM) 115 and random-access memory (RAM) 116, as well as power module (battery) 117, RF transceiver 118, and antenna 119. A The mobile communications device 100 sends and receives data through the RF transceiver 118, which may communicate with other devices via various networks, for example Bluetooth, local area networks such as WiFi, and cellular networks such as GSM or CDMA. The SIM card 114 is a removable integrated circuit that securely stores the international mobile subscriber identify (IMSI) and related security authentication information.

Also included in mobile communications device 100 but not shown in FIG. 3 are other familiar computer components, such as speaker, microphone, ports, jacks, connectors, camera, input/output (I/O) controller, display adapter, network interface, and the like.

The techniques described herein may be used with computer systems having different configurations, e.g., with additional or fewer components or subsystems. For example, a computer system could include more than one processor (i.e., a multiprocessor system, which may permit parallel processing of information) or a system may include a cache memory. The mobile communications device 100 shown in FIG. 3 is but one example of a computing device suitable for use. Other configurations of devices, systems and subsystems suitable for use will be readily apparent to one of ordinary skill in the art.

Computer software products may be written in any of various suitable programming languages, including C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, Java, and other programming languages. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

The operating system 102 for the mobile communications device 100 may be the Android operating system, iPhone OS (i.e., iOS), Windows Phone, Symbian, BlackBerry OS, Palm web OS, bada, Embedded Linux, MeeGo, Maemo, Limo, Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows 8, Windows CE, Windows Mobile, Windows Phone 7), Linux, HP-UX, UNIX, Sun OS, Solaris, Mac OS X, Alpha. OS, AIX, IRIX32, or IRIX64. Other operating systems may also be used.

Furthermore, the mobile communications device 100 may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. Data and other information may be passed between the mobile communications device and other components (or steps) of a system using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

2. AUXILIARY SECURITY COMMUNICATIONS

Figure 4:
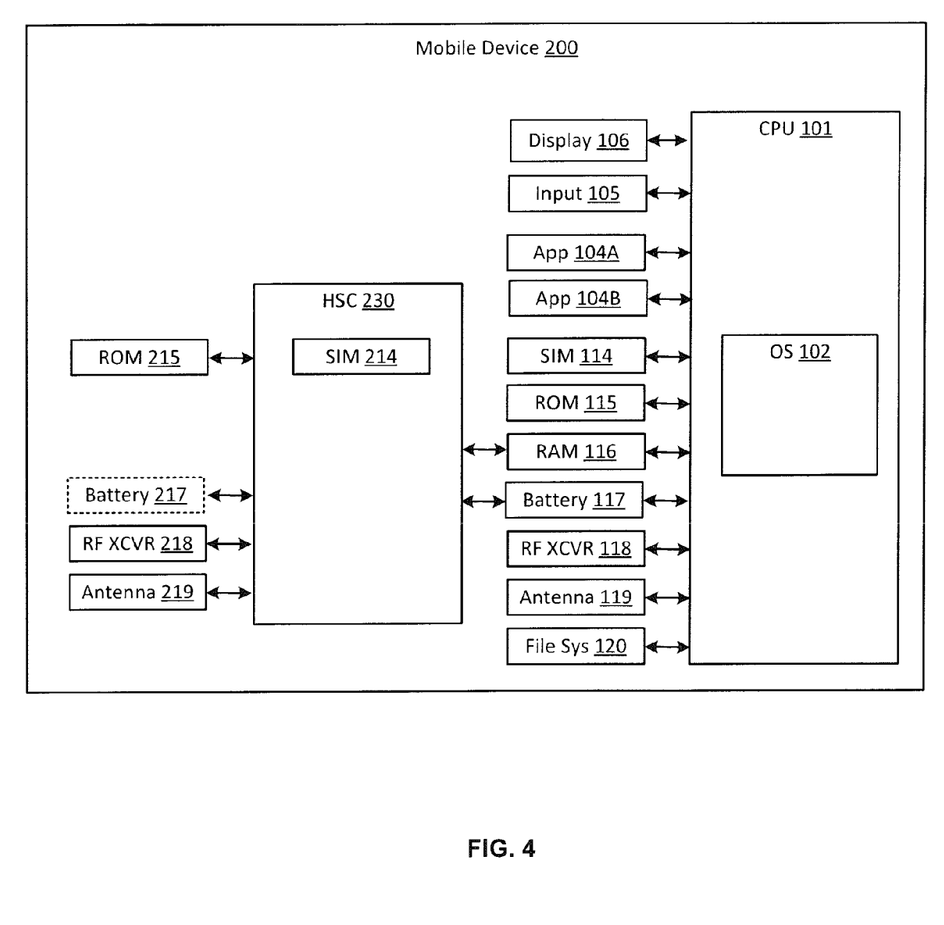
FIG. 4 is a block diagram of a computing device embodied as a mobile communications device with auxiliary communications capability.

Referring now to FIG. 4, another client device 200 embodied as a mobile communications device is illustrated. In this embodiment, client device 200 is configured with additional hardware to facilitate auxiliary communications in the event that the device 200 is lost or stolen.

Many of the components in mobile communications device 200 shown in FIG. 4 are the same as shown in device 100 of FIG. 3. However, in addition, mobile communications device 200 in configured with a secondary read-only memory 215 that is not coupled to the operating system 102 like the primary ROM 115, but instead, is separate and apart from the OS 102 and works in parallel with the OS, and thus, can remain hidden from the operation of the OS. A hidden security component 230 is provided on device 200 to interact with the hidden security ROM 215, and a secondary RF transceiver 218 and corresponding secondary antenna 219 are also provided to send and receive data transmissions under the direction of the hidden security component 230. The RAM 116 is also accessible to the hidden security component so that data in the RAM may be copied or transmitted as part of a security routine, or alternatively, wiped clean or stored with fake data in accord with another security routine.

The security ROM 215, security component 230, secondary RF transmitter 218 and secondary antenna 219 may draw power from the main battery 117, but optionally, a small dedicated long-lived battery 217 may also be provided as an alternative power source for the hidden security circuit.

Hidden security component 230 may be configured to receive a secondary SIM card 214, but preferably, the relevant subscriber identity and authentication information is hard-coded into the secondary ROM 215 and loaded into the security component 230 on start-up. This provides a SIM card equivalent thus enabling the security component 230 to make connections using the secondary RF transceiver 218 over the voice or messaging network. For example, the security component 230 is initialized by the secondary ROM 215 with its own dedicated telephone number or other unique identifier (e.g., an IP address) that is different from the primary telephone number associated with the OS 102 and its primary RF transceiver 118. Thus, security component 230 can access and use the voice and/or messaging network via the secondary RF transceiver 218 completely independent of the OS 102 and its primary RF transceiver 118, thereby allowing the hidden security component to be used to locate mobile communications device 200 when it is lost or stolen. In one embodiment, the security component 230 may make use of the primary RF transceiver 118 and primary device antenna 119 for making connections over the voice or messaging network, rather than have a separate RF transceiver 218 and antenna 219.

Figure 5:
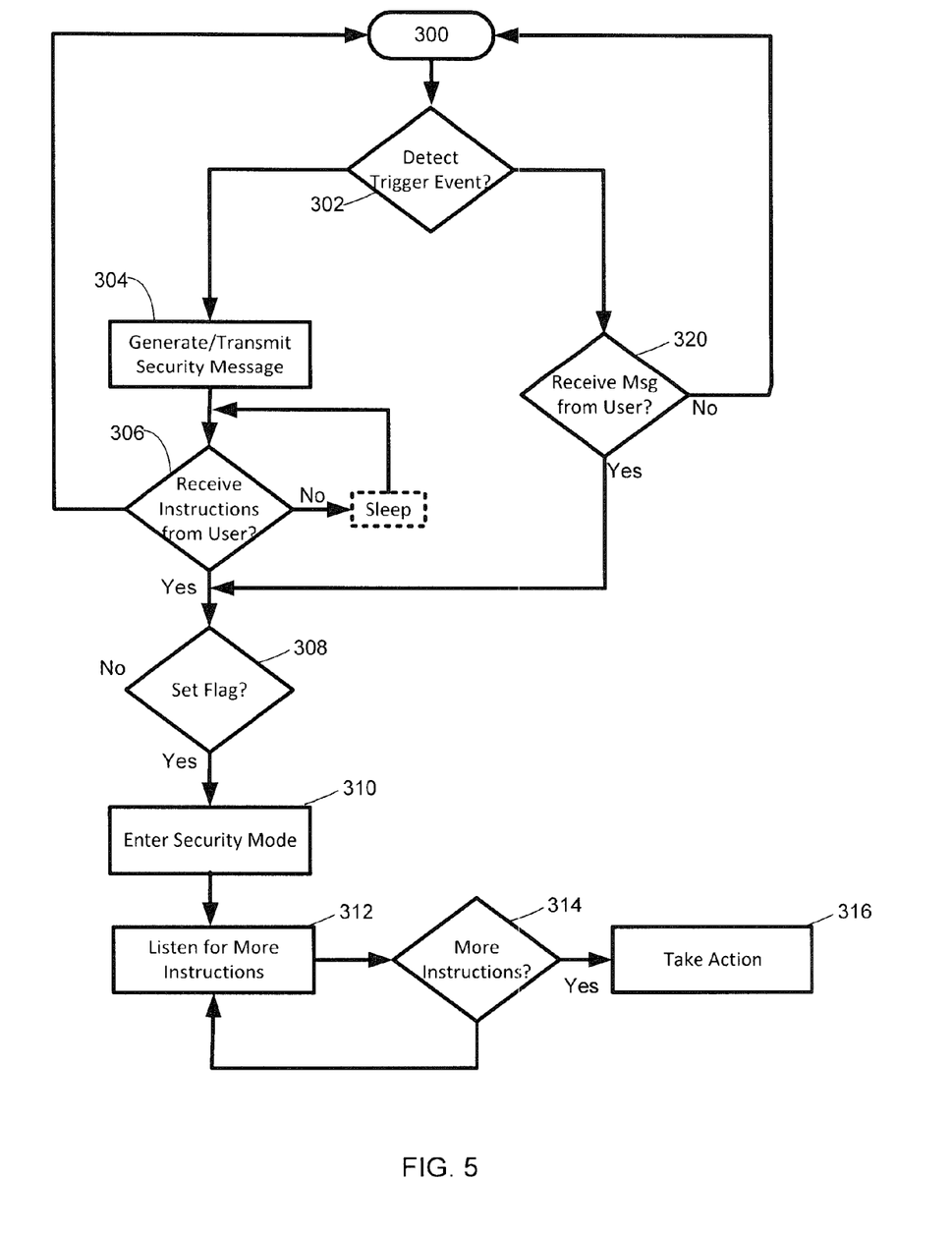
FIG. 5 is a flow chart illustrating a process for detecting and responding to defined security events on the mobile communications device of FIG. 4.

FIG. 5 illustrates a process 300 for using the security component 230 to facilitate finding device 200 after it has been lost or stolen. For example, it is typical if the phone has been stolen for some specific event to occur on the device 200, such as the removal of the primary SIM card 114 from the device, or the removal of the primary battery 117 from the device, and detection of such a trigger event can initiate a programmed security routine from security component 230. Other events could also occur if the phone has been stolen or lost, including the primary battery 117 going dead or dropping to a low charge level such that communications through the primary RF transceiver 118 is not possible. A number of these type of trigger events may be detected and cause a security routine to be initiated.

Process 300 waits for the detection of a defined trigger event in step 302. When a defined trigger event is detected in step 302, a response is generated by the security component 230 and transmitted to a specified destination device via the secondary RF transceiver 218 in step 304. The response generated by the security component 230 is the result of pre-programmed instructions installed in the security component from the hidden ROM 215 upon initialization of the device 200. The response may be a pre-recorded voice message, or preferably an SMS text message, to a specified phone number or IP address, indicating that the defined trigger event has occurred, and asking whether the device 200 should enter a special security mode for a lost or stolen device. In one embodiment, the device 200 could enter a pre-programmed security mode upon detection of a specified event without waiting for confirmation from the destination device. The destination device may be another mobile communications device owned by the user, or the user's home phone, or a special web site and/or server operating for the benefit of user.

The response generated by security component 230 can include the location of the device 200, which may be obtained from an existing geolocation service within the device, or from information about nearby cell towers or WiFi access points. See, for example, U.S. application Ser. No. 13/162,477 entitled Mobile Device Geolocation, which is incorporated herein in its entirety. Further, the response is preferably encrypted using known techniques, and therefore must be authenticated and decrypted by the destination device upon receipt.

Upon receiving and decrypting the response to the trigger event at the destination device, the user may generate and send instructions to the lost or stolen device 200 in step 306. For example, the instruction may be a simple Yes or No answer to the question of whether to enter a special security mode. Step 308 determines whether or not to enter the special security mode on device 200. If the user sends back "Yes" as the answer, or if a special command is received, then a flag may be set and the special security mode entered into by device 200 in step 310. The flag simply indicates that the special security mode is active on device 200. If No is the answer in step 308, then the flag will not be set in step 310, and the process returns to step 302 to wait for other detections of trigger events.

If the flag is set and the special security mode entered, then the security component 230 listens for further instructions from the user in step 312. If further instructions are received in step 314, then the security component 230 takes action corresponding to the instructions in step 316. All such instructions and actions are pre-programmed into the secondary security ROM 215. For example, some of the programmed actions could include wiping some or all of the data from the device 200; backing up some or all the data on the device; or substituting a "fake" set of data into the file system of the device.

Switching in a set of fake data may be accomplished by pre-configuring a set of data for calls, contacts, photos, and other files of the file system, into a designated location. The "switch" happens by removing the "real" from the file system 120 and placing the pre-configured "fake" files in their place, then adjusting as necessary, date and time fields in those files to reflect recent activities. The "real" files may be deleted, or may optionally be encrypted and moved to a different location within the file system 120. The objective is to prevent a person who has stolen the phone from being able to access the real data, and by providing data that looks real, the person may not suspect that this phone has a hidden circuit which can be used to provide the stolen phone's location to the owner.

Other programmed actions can include going to sleep while in the lost/stolen mode, then periodically waking up to send a message again. For example, if no message is received in step 306, then the hidden security component may be programmed to sleep for a defined period of time, then wake after the defined period to resend the security message. Providing a sleep mode will help to preserve battery life.

The user can provide other instructions in response to the security message sent by hidden security component 230. For example, the user can send a command to periodically record ambient audio, video or snapshots using the regular phone functions through OS 102. Such information could be transmitted immediately, or stored and transmitted later.

3. INITIALIZATION

Figure 6:
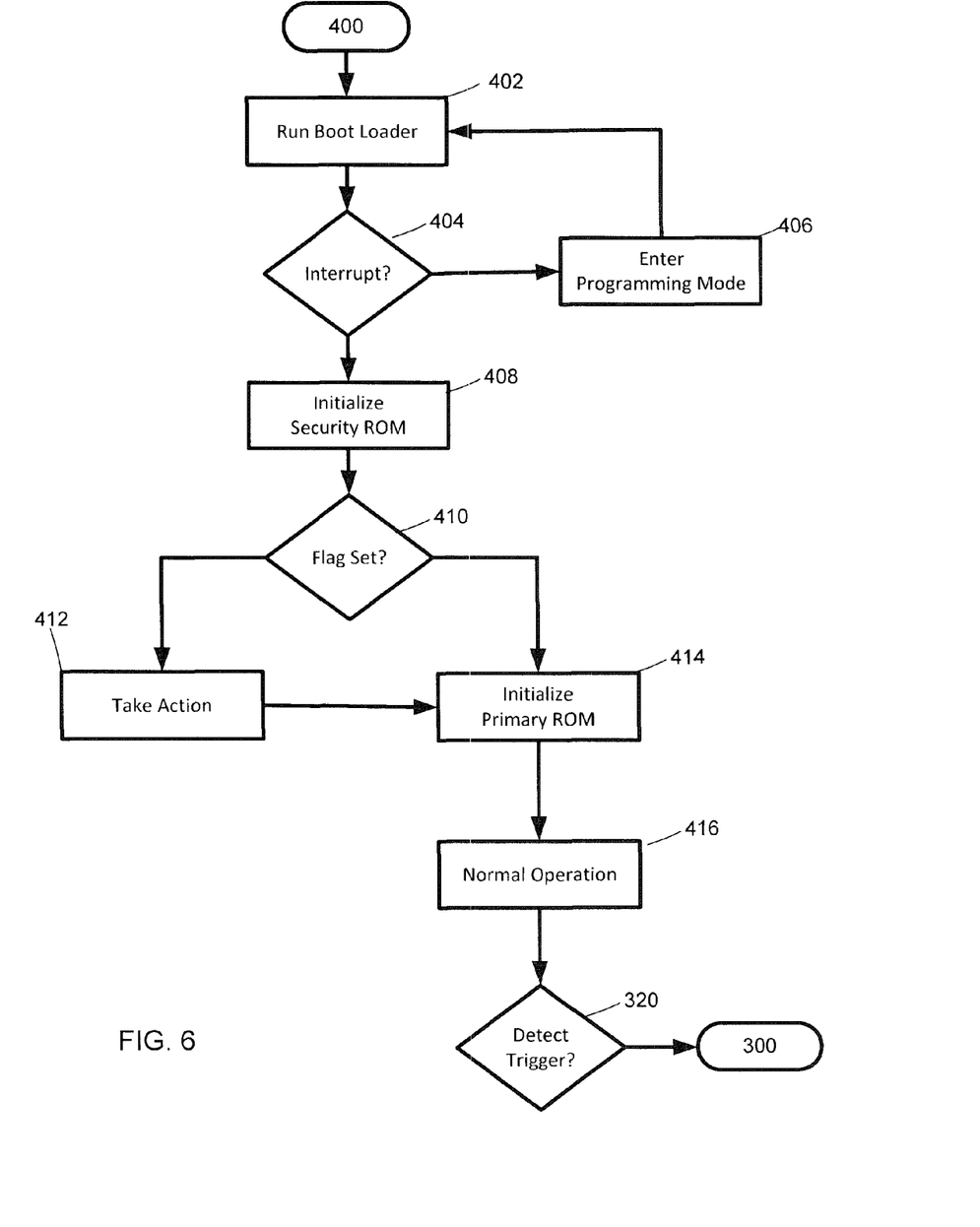
FIG. 6 is a flow chart illustrating a process for initializing the mobile communications device of FIG. 4.

The security component 230 will be initialized upon start-up of mobile communications device 200, along with the OS 102 and related functions, as illustrated by process 400 in FIG. 6. At power up, the CPU 101 is in a state where no initializations have been done. Internal clocks are not set, and the only available memory is the internal RAM 116.

When the power supply is stable, the normal first step for conventional mobile communications device 100 is the "boot ROM" execution of hard-coded instructions in the primary ROM 115, which detects the boot media. However, for mobile communications device 200, the boot ROM process is modified since the initialization of the secondary or hidden ROM 215 must occur first for this device.

In step 402, the modified boot ROM program is run. In step 404, if the boot ROM program detects an I/O interrupt or a key pressed by user, then the boot ROM program is suspended and a special programming mode is entered at step 406. This typically occurs when the user is a software developer and wants to install a new program or widget on the device, or troubleshoot the start-up routine or other existing programs or routines on the device. When the user is done with step 406, the process returns to step 402 to run or complete running the boot ROM program.

If there is no interrupt detected at step 404, then the boot ROM program proceeds to initialize the security component 230 from the secondary ROM 215 in step 408. This includes loading executable instructions from ROM 215 into the security component 230 that will configure (i) the secondary transceiver 218, (ii) power to the secondary transceiver, and (iii) trigger logic to be used in process 300. For example, the trigger logic will include pre-programmed routines for sending or receiving a message or call, as well as for recording or storing relevant data or faked data, or erasing relevant data.

In step 410, if a security flag is set, for example, as described in process 300 above, then specified actions may be performed in step 412 under control of the security component 230. For example, critical data may be erased or replaced with fake data, as described above. After step 412, or if the flag was not set in step 410, the process goes to step 414 to initialize the primary ROM 115. This step loads the Linux kernel and OS into RAM, then boots the OS, which causes the initial set up of memory, I/O, interrupts, drivers, daemons, etc., as well as the initialization of core services, core applications, and other processes.

Device 200 is then engaged in normal device operations in step 416, unless and until a defined trigger event is detected in step 302, which interrupts normal operations and invokes process 300, as previously described.

4. CONCLUSION

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for locating a lost or stolen mobile communications device, wherein a mobile communications device operating system resides in a primary read-only memory, and relevant data and components for the operating system are loaded from the primary read-only memory into a random-access memory of the mobile communications device, comprising:
   providing a secondary read-only memory in the mobile communications device configured to work separately from and in parallel with the operating system, the secondary read-only memory storing computer-readable instructions, which when executed by a processor, operate a first security component and a security transceiver, the security transceiver configured to operate independently of a primary transceiver also controlled by the operating system;
   detecting, by the first security component, an occurrence of a defined trigger event;
   in response to the detected trigger event, transmitting by the security transceiver a first security message to a remote device;
   receiving, by the security transceiver, a second security message from the remote device; and
   performing, by the first security component, a defined action on the mobile communications device in response to the received second security message.

2. The method of claim 1, further comprising:
   setting a flag if the second security message indicates that the mobile communications device has been reported as lost or stolen.

3. The method of claim 2, further comprising:
   backing up at least some of the data in the random-access memory if the flag is set.

4. The method of claim 2, further comprising:
   erasing at least some of the data in the random-access memory if the flag is set.

5. The method of claim 2, further comprising:
   substituting fake data for at least some of the data in the random-access memory if the flag is set.

6. The method of claim 2, further comprising:
   obtaining a location for the mobile communications device if the flag is set; and
   transmitting, by the security transceiver, the location to the remote device.

7. The method of claim 2, further comprising:
   placing the secondary read-only memory into a sleep mode if the flag is set; and periodically waking up the secondary read-only memory to send transmissions to the remote device.

8. The method of claim 2, further comprising:
receiving, by the security transceiver, at least one command from the remote device if the flag is set; and
performing, by the first security component, a defined action on the mobile communications device in response to the command.

9. The method of claim 2, further comprising:
recording, using the operating system, audio, video or picture information if the flag is set; and
storing, in a predefined location in the random-access memory, the audio, video or picture information.

10. The method of claim 9, further comprising:
transmitting, by the security transceiver, the audio, video or picture information to the remote device.

11. The method of claim 1, wherein the defined trigger events include removing a primary SIM card, removing a primary battery, and detecting a low power level at the primary battery.

12. A method for starting up and operating a mobile communications device, wherein a mobile communications device operating system resides in a primary read-only memory, and relevant data and components for the operating system are loaded from the primary read-only memory into a random-access memory of the mobile communications device, comprising:
(i) initializing a secondary read-only memory that stores computer-readable instructions, which when executed by a processor, configure a first security component to (a) control a first transceiver, (b) detect defined events occurring within the operating system, (c) capture and store data in a predefined location in the random-access memory in response to a defined event, and (d) send and receive transmissions with the first transceiver;
(ii) performing a defined action on data in the secondary read-only memory if a flag is set indicating that the mobile communications device has been lost or stolen;
(iii) initializing the primary read-only memory that stores computer-readable instructions, which when executed by a processor, configure the operating system to (a) load relevant data and computer-readable instructions into the random-access memory, (b) control a second transceiver, and (c) send and receive transmissions with the second transceiver;
(iv) operating the mobile communications device in accord with the operating system;
(v) detecting, by the first security component, a defined trigger event occurring in the operating system;
(vi) transmitting, by the first transceiver in response to the detected trigger event, a first security message to a remote device; and
(vii) setting the flag if a second security message is received by the first transceiver from a remote device indicating that the mobile communications device has been reported as lost or stolen.

13. The method of claim 12, the defined action further comprising:
backing up at least some of the data in the random-access memory if the flag is set.

14. The method of claim 12, the defined action further comprising:
erasing at least some of the data in the random-access memory if the flag is set.

15. The method of claim 12, the defined action further comprising:
substituting fake data for at least some of the data in the random-access memory if the flag is set.

16. The method of claim 12, the defined action further comprising:
obtaining a location for the mobile communications device if the flag is set; and
transmitting, by the first transceiver, the location to the remote device.

17. The method of claim 12, the defined action further comprising:
placing the secondary read-only memory into a sleep mode if the flag is set; and
periodically waking up the secondary read-only memory to send transmissions from the first transceiver to the remote device.

18. The method of claim 12, the defined action further comprising:
receiving, by the first transceiver, at least one command from the remote device if the flag is set; and
performing, by the first security component, a defined action on the mobile communications device in response to the command.

19. The method of claim 12, the defined action further comprising:
recording, using the operating system, audio, video or picture information if the flag is set; and
storing, in a predefined location in the random-access memory, the audio, video or picture information.

20. The method of claim 19, the defined action further comprising:
transmitting, by the first transceiver, the audio, video or picture information to the remote device.

21. The method of claim 12, wherein the defined trigger events include removing a primary SIM card, removing a primary battery, and detecting a low power level at the primary battery.

22. A mobile communications device, comprising:
a random-access memory;
a primary read-only memory storing computer-readable instructions, which when executed by a processor operate a first security component to erase at least some of the data in a defined location of the random-access memory if a security flag is set;
an operating system residing on the primary read-only memory, wherein relevant data and components for the operating system are loaded from the primary read-only memory into the random-access memory on start-up;
a primary transceiver controlled by the operating system; and
a secondary read-only memory storing computer-readable instructions, which when executed by a processor configure the secondary read-only memory to work separately from and in parallel with the operating system, the secondary read-only memory also including computer-readable instructions to operate a second security component and a security transceiver, the security transceiver configured to operate independently of the primary transceiver, the second security component configured to monitor the operating system to detect at least one defined trigger event, wherein the security transceiver transmits a security message to a remote device if a defined trigger event is detected;
wherein the random-access memory includes a third security component configured to save data into a defined location.

23. The mobile communications device of claim 22, wherein the primary read-only memory is configured to erase at least some data in the random-access memory if the security flag is set.

24. The mobile communications device of claim 22, wherein the secondary read-only memory is configured to substitute fake data for actual data in the defined location of the random-access memory if the security flag is set.

25. The mobile communications device of claim 22, wherein the secondary read-only memory is configured to obtain a location for the mobile communications device if the security flag is set, and to transmit the location to the remote device using the security transceiver.

26. The mobile communications device of claim 22, wherein the secondary read-only memory is configured to enter a sleep mode if the security flag is set, and to periodically wake up and send transmissions from the security transceiver to the remote device.

27. The mobile communications device of claim 22, wherein the secondary read-only memory is configured to receive at least one command from the remote device via the security transceiver if the flag is set, and to perform a defined action on the mobile communications device using the second security component in response to the command.

28. The mobile communications device of claim 22, wherein the secondary read-only memory is configured to record, using the operating system, audio, video or picture information if the flag is set, and to store, in a predefined location in the random-access memory, the audio, video or picture information.

29. The mobile communications device of claim 22, wherein the security transceiver is configured to transmit the audio, video or picture information to the remote device.

30. The mobile communications device of claim 22, wherein the defined trigger events include removing a primary SIM card, removing a primary battery, and detecting a low power level at the primary battery.

* * * * *